E. M. & G. L. ADAMS.
DINNER PAIL.
APPLICATION FILED JUNE 12, 1908.
940,571.
Patented Nov. 16, 1909.
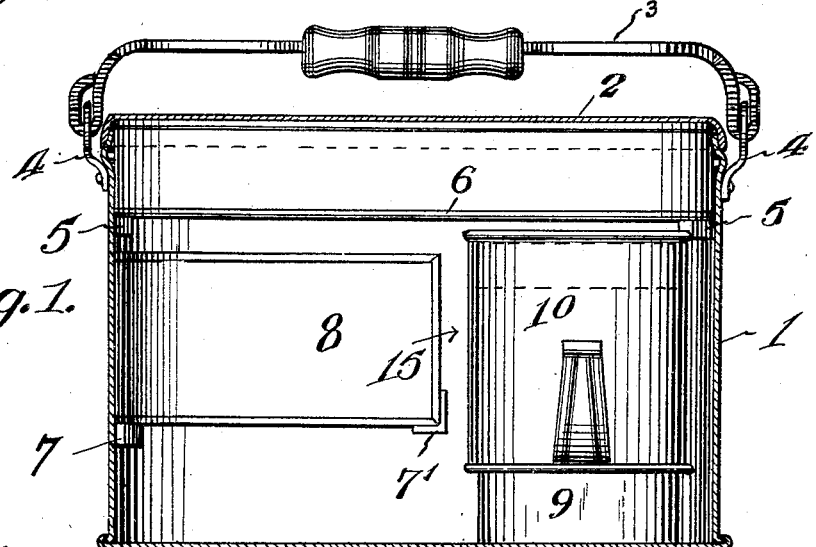
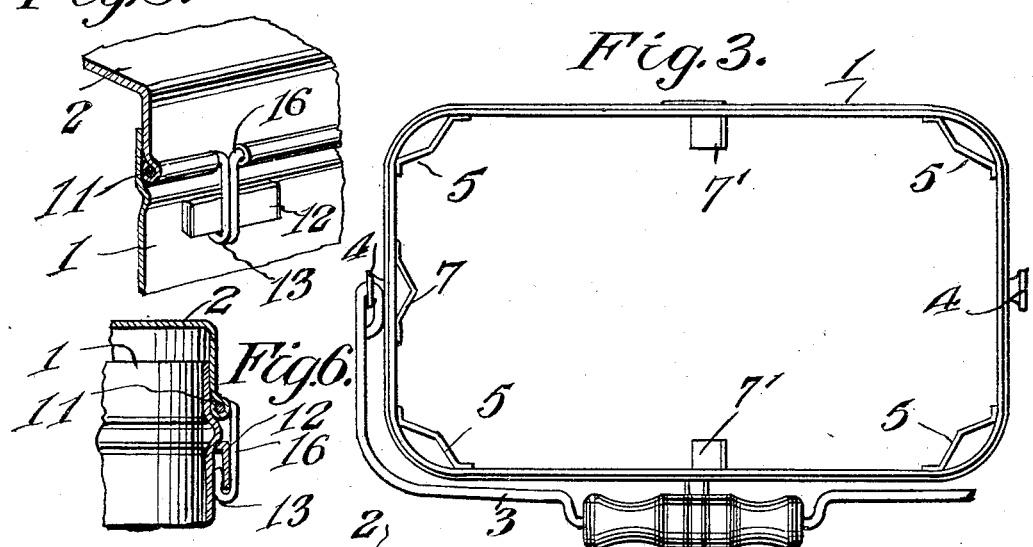
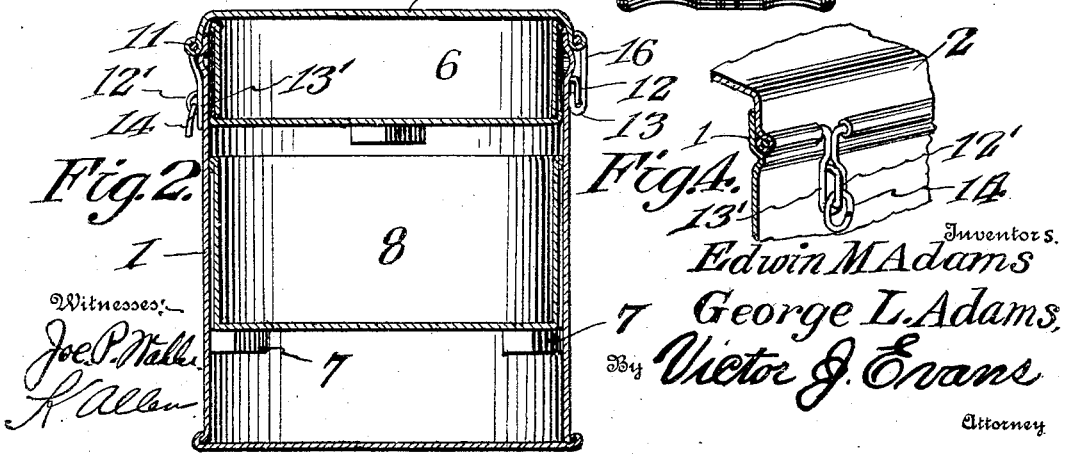
Inventors
Edwin M Adams
George L. Adams,
By Victor J. Evans
Attorney
Witnesses:
Joe P. Waller
R. Allen

UNITED STATES PATENT OFFICE.

EDWIN M. ADAMS AND GEORGE L. ADAMS, OF OWEGO, NEW YORK.

DINNER-PAIL.

940,571. Specification of Letters Patent. Patented Nov. 16, 1909.

Application filed June 12, 1908. Serial No. 438,244.

*To all whom it may concern:*

Be it known that we, EDWIN M. ADAMS and GEORGE L. ADAMS, citizens of the United States, residing at Owego, in the county of Tioga and State of New York, have invented new and useful Improvements in Dinner-Pails, of which the following is a specification.

This invention relates to improvements in dinner pails.

The invention has for its object the provision of a device of this character whereby receptacles or trays are conveniently arranged and supported within, in which the user may carry semisolid foods, as custards, puddings, etc.

The invention consists in a metallic receptacle, or pail having so arranged therein a drinking vessel, and a series of trays, that ample space is allowed for solid foods, as bread, meat, and fruit.

In the drawing illustrating our invention, Figure 1 is a longitudinal sectional view of our invention. Fig. 2 is a transverse sectional view of the same. Fig. 3 is a plan view of the invention the cover being removed. Fig. 4 is a fragmental view showing the lock. Figs. 5 and 6 are fragmental views of the invention showing the hinge member.

In the drawing 1 represents a metallic bucket, approximately rectangular in shape, provided with the usual lid 2, and bail 3 pivoted to the ears 4. Within the bucket, and secured to the walls at the corners are brackets 5, adapted to support the shallow tray 6 which snugly fits within the upper portion of said bucket. The brackets 7 secured to the inner side walls, and the bracket 7 secured to the inner end wall serve to support the deep tray 8. This tray 8 is approximately as wide as the bucket but about one-half as long, thus providing a space 15 at the other end of said bucket for a drinking vessel 9 of glass or other non-rusting material on which is telescoped a metal receptacle 10 used to heat a drink, as coffee or tea.

The lid 2 is held closed by any suitable fastening means, as a pivoted hook 13 engaging a block 12 as seen in Figs. 5 and 6, or a hasp 13' engaging a staple 12' and held by an open ring 14.

It will be seen that a bucket is provided which will contain a dinner of various dishes, such as bread, meat, coffee or tea, custards, or puddings, etc.

The lid 2 has its edges rolled over a wire 11. Near the upper edge on the rear outer wall is a socket 12 of metal. The roll of the edge of the lid is broken at 16 to allow the wire 11 to protrude in doubled form and bent to form the hook 13. The hook 13 engages in the socket 12, (best seen in Figs. 5 and 6). In Fig. 4 the wire is formed in the form of a hasp 13' which receives the staple 12'. An open ring 14 engages the staple 12' and prevents the displacement of the hasp 13' from the staple 12'.

To remove the lid the ring 14 is removed from the staple 12', the hasp lifted and the lid thrown back on the hinge whereby the hook 13 will be disengaged from the socket 12. The lid is then free from the bucket.

The operation is reversed to replace the lid.

Having described our invention, what we claim and desire to secure by Letters Patent is:

1. A dinner pail including a lid, a rolled rim having a wire therein, a pair of openings in said rolled rim, a hook formed in said wire and projecting from one of said openings, a hasp also formed in said wire and projecting from the other of said openings, a socket member to receive said hook, and a staple to engage said hasp.

2. A dinner pail including a lid, a rolled rim having a wire therein, a pair of openings in said rolled rim, a hook formed in said wire and projecting from one of said openings, a hasp also formed in said wire and projecting from the other of said openings, a socket member secured to the pail to receive said hook, a staple to engage said hasp, and an open ring to engage said staple and lock said hasp.

In testimony whereof we affix our signatures in presence of two witnesses.

EDWIN M. ADAMS.
GEORGE L. ADAMS.

Witnesses:
CHAS. F. COLBY,
ROBT. WINANS.